US008830199B2

(12) United States Patent
Yasumoto

(10) Patent No.: US 8,830,199 B2
(45) Date of Patent: Sep. 9, 2014

(54) INFORMATION PROCESSING APPARATUS

(71) Applicant: Alpine Electronics, Inc., Tokyo (JP)

(72) Inventor: Takashi Yasumoto, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 168 days.

(21) Appl. No.: 13/691,060

(22) Filed: Nov. 30, 2012

(65) Prior Publication Data
US 2013/0147734 A1    Jun. 13, 2013

(30) Foreign Application Priority Data

Dec. 7, 2011  (JP) ................................ 2011-267441

(51) Int. Cl.
*G06F 3/041*  (2006.01)
*G06F 3/045*  (2006.01)

(52) U.S. Cl.
CPC ............... *G06F 3/041* (2013.01); *G06F 3/045* (2013.01); *G06F 3/0416* (2013.01)
USPC ........................................................ 345/173

(58) Field of Classification Search
CPC ............................. G06F 3/0414; G06F 3/045
USPC .................................................. 345/173, 174
See application file for complete search history.

(56) References Cited

U.S. PATENT DOCUMENTS

2011/0021251 A1    1/2011  Linden

FOREIGN PATENT DOCUMENTS

| JP | 2005-275632 | 10/2005 |
| JP | 2006-039745 | 2/2006 |
| JP | 2010-239283 | 10/2010 |

OTHER PUBLICATIONS

Bose et al., Terminal Mode—Transforming Mobile Devices into Automotive Application Platforms, Nov. 2010, Proceedings of the Second international Conference on Automotive User Interfaces and Interactive Vehicular Applications, pp. 148-155.*

* cited by examiner

*Primary Examiner* — Latanya Bibbins
(74) *Attorney, Agent, or Firm* — Brinks Gilson & Lione

(57) ABSTRACT

An in-vehicle apparatus includes an LCD that displays an operation screen, an operation position detector that detects a position that is part of the operation screen displayed on the LCD and that is touched by a user with an operation force larger than or equal to an operation determination threshold value with a touch panel on a certain detection cycle, a connection determiner that determines whether a mobile terminal apparatus is connected to the in-vehicle apparatus, and an operation determination threshold value changer that changes the operation determination threshold value to a value corresponding to the connected mobile terminal apparatus if the connection determiner determines that the mobile terminal apparatus is connected to the in-vehicle apparatus.

20 Claims, 6 Drawing Sheets

INFORMATION PROCESSING APPARATUS

BACKGROUND OF THE INVENTION

1. Related Application

The present application claims priority to Japanese Patent Application Number 2011-267441, filed Dec. 7, 2011, the entirety of which is hereby incorporated by reference.

2. Field of the Invention

The present invention relates to an information processing apparatus that performs processing in cooperation with a mobile terminal apparatus connected to the information processing apparatus via, for example, a universal serial bus (USB) interface.

3. Description of the Related Art

Configurations have hitherto been known in which, when in-vehicle devices are connected to mobile devices, functions of the mobile devices can be used in response to operations at the side of the in-vehicle devices (for example, refer to Japanese Unexamined Patent Application Publication No. 2010-239283).

An interface standard called a terminal mode in which a mobile device can be operated on the screen of an in-vehicle device has been put into practical use in recent years. In the terminal mode, the content of display that is the same as the one on the touch panel of the mobile device can be displayed on the screen of the in-vehicle device to allow various operations for the mobile device to be performed by using the touch panel of the in-vehicle device. Since the content of operation with the touch panel of the mobile device can be realized on the touch panel of the in-vehicle device in the above manner, it is possible to allow the operation using the familiar operation screen of the mobile device to improve the user-friendliness.

Various configurations in which operations are performed by using touch panels have been hitherto known (for example, refer to Japanese Unexamined Patent Application Publication No. 2005-275632 and Japanese Unexamined Patent Application Publication No. 2006-39745).

When an instruction for processing to be performed with an in-vehicle device in cooperation with a mobile terminal apparatus (mobile device) connected to the in-vehicle device is issued with the touch panel of the in-vehicle device, as disclosed in Japanese Unexamined Patent Application Publication No. 2010-239283 for example, there is a problem in that a user may have a feeling of discomfort in the operation of the in-vehicle device if the operation force of the touch panel of the in-vehicle device is greatly different from that of the touch panel of the mobile terminal apparatus.

For example, since the same operation screen is displayed on both the in-vehicle device and the mobile terminal apparatus in the terminal mode, the user can possibly operate the touch panel of the in-vehicle device with an expectation of an operational feeling similar to that of the mobile terminal apparatus. In such a case, the user has the feeling of discomfort in the operation of the in-vehicle device and malfunction can be caused if the operation force of the touch panel of the in-vehicle device is greatly different from that of the touch panel of the mobile terminal apparatus.

In particular, the operation is performed with an operation force of about 0.2 N in pressure in an electrostatic touch panel commonly used for the mobile device, whereas the operation force is set to about 1 N to 2 N in a resistive film touch panel commonly used for the in-vehicle device when the operation force is summed up with the operational forces of other mechanical operation keys in the same in-vehicle device. Accordingly, there is a large difference in the operation force between the electrostatic touch panel and the resistive film touch panel. Consequently, in addition to an occurrence of the feeling of discomfort in the operation, the user is not capable of performing a desired operation because of lack of the operation force even when, for example, a swipe operation is performed with the in-vehicle device in the same manner as in the operation of the mobile terminal apparatus.

SUMMARY

In order to resolve the above problems, it is desirable to provide an information processing apparatus, such as an in-vehicle device, capable of reducing the feeling of discomfort in operations and malfunction when the information processing apparatus is used with a mobile terminal apparatus.

An information processing apparatus according to an embodiment to which a mobile terminal apparatus is connectable includes a display unit configured to display an operation screen; an operation position detecting unit configured to detect a position that is part of the operation screen displayed on the display unit and that is touched by a user with an operation force larger than or equal to an operation determination threshold value with a first touch panel on a certain detection cycle; a connection determining unit configured to determine whether the mobile terminal apparatus is connected to the information processing apparatus; and an operation determination threshold value changing unit configured to change the operation determination threshold value to a value corresponding to the connected mobile terminal apparatus if the connection determining unit determines that the mobile terminal apparatus is connected to the information processing apparatus.

Since the operation determination threshold value for determining whether the operation with the first touch panel is performed is changed in accordance with the mobile terminal apparatus connected to the information processing apparatus upon connection of the mobile terminal apparatus, it is possible to perform the operation with an operation force similar to that of the connected mobile terminal apparatus to eliminate the feeling of discomfort when the information processing apparatus is operated. In addition, since it is sufficient for the user to operate the information processing apparatus with the same operation force as that for the mobile terminal apparatus which the user ordinarily uses, it is possible to prevent malfunction caused by the difference in the operation determination threshold value.

The information processing apparatus preferably further includes an operation detection cycle changing unit configured to change the detection cycle to a value corresponding to the connected mobile terminal apparatus if the connection determining unit determines that the mobile terminal apparatus is connected to the information processing apparatus. The operation detection cycle changing unit preferably sets the detection cycle to a value proportional to the operation determination threshold value corresponding to the connected mobile terminal apparatus.

In order to cause a larger operation force to be exerted on the first touch panel on the operation screen, the operation force is gradually increased after the operation screen is lightly touched by the user with his/her finger or the like and it takes a long time to cause the larger operation force to be exerted. Since increasing the time (cycle) before it is determined whether the operation force is exerted causes the user to continue to press the first touch panel in a non-responsive state until that time, the operation force is gradually increased. In other words, it is possible to expect an effect (a reduction of the feeling of discomfort) similar to that when the operation determination threshold value is variably set also by increasing the determination cycle in proportion to the magnitude of the operation force. In addition, since the increase in the determination cycle decreases the determination count, it is possible to relieve the processing load.

The mobile terminal apparatus preferably includes a second touch panel with which a position that is part of an operation screen displayed on a display unit of the mobile terminal apparatus and that is touched by the user with a certain operation force is detected. The operation determination threshold value changing unit preferably changes the operation determination threshold value from a current value to a value close to a minimum value of the operation force with which position detection with the second touch panel is available. In particular, the operation detection cycle changing unit preferably sets the value that is equal to the minimum value of the operation force with which the position detection with the second touch panel is available as the operation determination threshold value subjected to the change. This allows the feeling of discomfort caused by the difference in the operation force between the operation with the touch panel of the mobile terminal apparatus and the operation with the touch panel of the information processing apparatus to be reliably eliminated or to be reduced.

The operation detection cycle changing unit preferably sets the detection cycle to a value proportional to a magnitude of the operation determination threshold value corresponding to the connected mobile terminal apparatus. This allows an appropriate detection cycle corresponding to the operation determination threshold value to be set and allows the detection cycle to be automatically determined in response to the determination of the operation determination threshold value. Accordingly, the detection cycle is easily set.

The operation determination threshold value and the detection cycle are preferably changed to initial setting values before the mobile terminal apparatus is connected if the connection determining unit determines that the mobile terminal apparatus is disconnected. The operation determination threshold value can be temporarily changed only when the mobile terminal apparatus is connected to keep an optimal operation state that is set when the information processing apparatus is solely used.

The information processing apparatus preferably further includes an operating unit including a mechanical movable part, and the initial setting value of the operation determination threshold value is preferably equal to the value necessary for the operation of the operating unit. This allows the feeling of discomfort occurring when both an operation with the touch panel and an operation with another operating unit are used to be eliminated.

The information processing apparatus preferably further includes an operation determination threshold value storing unit configured to store the mobile terminal apparatus that is a target for connection in association with the operation determination threshold value corresponding to the mobile terminal apparatus. The operation determination threshold value changing unit preferably reads out the operation determination threshold value corresponding to the connected mobile terminal apparatus from the operation determination threshold value storing unit. This allows an appropriate operation determination threshold value corresponding to the connected mobile terminal apparatus to be set.

The first touch panel preferably is a resistive film touch panel. In the case of the resistive film touch panel, since the increase in the operation force increases the contact area with a finger or the like of the user, a characteristic value corresponding to the increase in the contact area can be used to vary the operation determination threshold value.

The first touch panel preferably includes two transparent panels spaced apart by a certain distance, resistance films that are made of a transparent conductive material and that are provided on opposing faces of the two respective transparent panels, and a current value detecting unit that detects the value of current flowing when a certain voltage is applied to both ends of the resistance film provided on each of the two transparent panels. The operation position detecting unit preferably determines whether the operation force of the user is larger than or equal to the operation determination threshold value on the basis of the current value detected by the current value detecting unit. It is preferred that the operation position detecting unit determine whether the operation force of the user is larger than or equal to the operation determination threshold value on the detection cycle and identify an operation position touched by the user if the operation force of the user is larger than or equal to the operation determination threshold value. This allows the magnitude of the operation force exerted on the touch panel to be detected. The detected operation force can be compared with the operation determination threshold value to determine whether the operation using the operation determination threshold value subjected to the change is performed.

The information processing apparatus preferably further includes an operation determination threshold value manual setting unit configured to set the operation determination threshold value in response to an instruction from the user if the operation determination threshold value corresponding to the connected mobile terminal apparatus is not stored in the operation determination threshold value storing unit. This allows the operation determination threshold value to be manually changed even when no data exists for the connected mobile terminal apparatus. Accordingly, it is possible to reduce the feeling of discomfort caused by the difference in the operation force between the operation with the touch panel of the mobile terminal apparatus and the operation with the touch panel of the information processing apparatus.

When the information processing apparatus is mounted in a vehicle, it is possible to eliminate the feeling of discomfort in the operation occurring when the mobile terminal apparatus is connected to the information processing apparatus mounted in the vehicle.

When the second touch panel is an electrostatic touch panel, it is possible to realize an operational feeling similar to that of the mobile terminal apparatus having the electrostatic touch panel that is operable with a small operation force also in the operation of the information processing apparatus to prevent malfunction when, for example, a swipe operation is performed.

DESCRIPTION OF THE PREFERRED EMBODIMENTS

Figure 1:
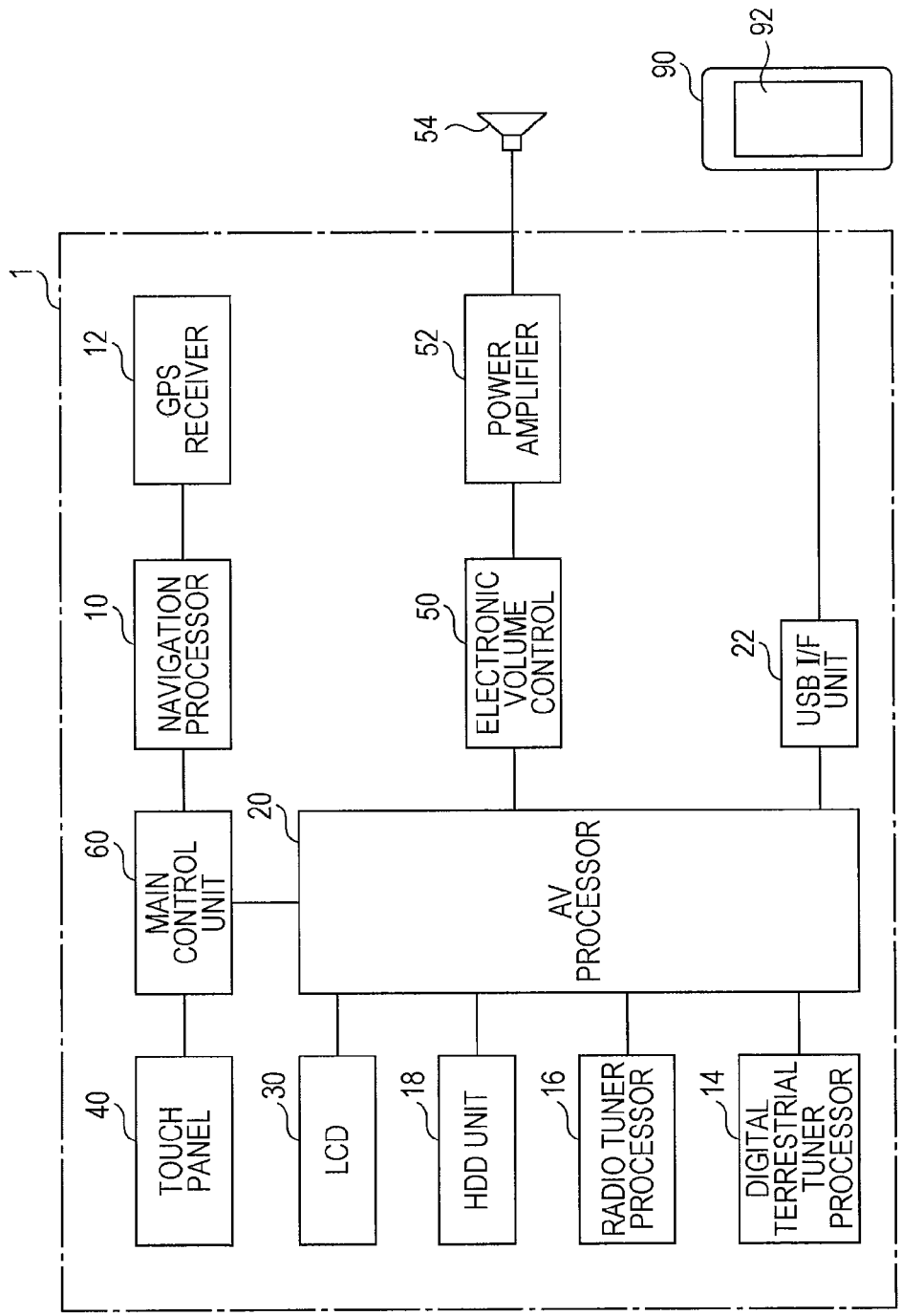
FIG. 1 is a block diagram showing an example of the entire configuration of an in-vehicle apparatus according to an embodiment.

An in-vehicle apparatus to which an information processing apparatus according to an embodiment of the present invention is applied will be described with reference to the attached drawings. FIG. 1 is a block diagram showing an example of the entire configuration of an in-vehicle apparatus according to an embodiment. Referring to FIG. 1, an in-vehicle apparatus 1 according to the present embodiment includes a navigation processor 10, a Global Positioning System (GPS) receiver 12, a digital terrestrial tuner processor 14, a radio tuner processor 16, a hard disk drive (HDD) unit 18, an audio-video (AV) processor 20, a USB interface (USB I/F) unit 22, a liquid crystal display (LCD) 30, a touch panel 40, an electronic volume control 50, a power amplifier 52, a speaker 54, and a main control unit 60.

The navigation processor 10 performs navigation operations for guiding the travel of a vehicle in which the in-vehicle apparatus 1 is mounted by using map data stored in the hard disk drive unit 18. The navigation processor 10 is used with the GPS receiver 12 that detects the position of the user's vehicle. The navigation operations for guiding the travel of a vehicle include an operation to search for and display peripheral facilities and Points Of Interest (POIs), in addition to display of a map and route search and guidance. The detection of the position of the user's vehicle may be performed by a combination of the GPS receiver 12 and an autonomous navigation sensor, such as a gyro sensor and a vehicle speed sensor.

The digital terrestrial tuner processor 14 receives a broadcast signal of digital terrestrial broadcasting to play back video and audio. The radio tuner processor 16 receives a signal of radio broadcasting to play back audio.

The hard disk drive unit 18 stores, for example, music data to be subjected to the audio playback and a content list used in the playback operation, in addition to map data and data for searching for peripheral facilities and the POIs used in the navigation operations by the navigation processor 10. The content list includes a folder structure, a file structure, and a file attribute of content data (music data). A semiconductor memory, such as a flash memory drive (a solid state drive (SSD)), may be used with the hard disk drive unit 18 or instead of the hard disk drive unit 18.

The AV processor 20 performs processing concerning the audio and the video corresponding to the navigation processor 10, the digital terrestrial tuner processor 14, and the radio tuner processor 16 described above. For example, the AV processor 20 converts video data supplied from the navigation processor 10 or the digital terrestrial tuner processor 14 into a signal appropriate for the display in the LCD 30 or decodes audio data supplied from the navigation processor 10, the digital terrestrial tuner processor 14, or the radio tuner processor 16, if needed, and outputs the data subjected to the decoding. In addition, the AV processor 20 reads out music data of a certain format stored in the hard disk drive unit 18, decodes the read out data, and converts the decoded data into audio data subjected to the decoding to play back the music.

The USB interface unit 22 is used to receive and transmit a signal from and to a mobile terminal apparatus 90 or another USB device via a USB cable and includes a USB port and a USB host controller. For example, the USB interface unit 22 may be incorporated in a large scale integration (LSI) that corresponds to the AV processor 20 and that functions as an AV chip set.

In the present embodiment, the AV processor 20 performs the processing supporting the terminal mode when some of the mobile terminal apparatuses 90 are connected to the USB interface unit 22 via the USB cable. The terminal mode is an interface standard defined by Consumer Electronics for Automotive (CE4A), which is a standard working group for interface between in-vehicle electronic control units (ECUs) and mobile devices. When the AV processor 20 (the in-vehicle apparatus 1) and the mobile terminal apparatus 90 operate in the terminal mode, the display screen that is the same as the display screen of the mobile terminal apparatus 90 is displayed on the LCD 30 in the in-vehicle apparatus 1 to allow various operations with a touch panel 92 of the mobile terminal apparatus 90 to be performed also with the touch panel 40 of the in-vehicle apparatus 1.

The LCD 30 displays video on the basis of the signal supplied from the AV processor 20. This video includes, in addition to a map image and a search image created by the navigation processor 10 and a program image created by the digital terrestrial tuner processor 14, various operation images (operation screens) used by the user to issue instructions necessary for the creation of the images and other processing. Although the LCD 30 is used as a display unit in the present embodiment, a display unit using another method, such as an organic electroluminescence (EL) display or a cathode ray tube (CRT), may be used.

The touch panel 40 is a resistive film touch panel and is arranged so as to be superimposed on the front face of the LCD 30. In this specification, the "operation force" means a pressure load applied on, for example, the touch panel 40 in response to the touch of a finger of the user who is to perform an operation for the in-vehicle apparatus 1 with the touch panel 40 or the like. A specific configuration of the touch panel 40 will be described below. The electronic volume control 50 receives the audio data supplied from the AV processor 20 to adjust the volume of an audio sound to be output from the speaker 54. The power amplifier 52 receives the audio data supplied from the electronic volume control 50 to drive the speaker 54 with the adjusted volume. The speaker 54 is provided at a certain position in the vehicle interior and is driven by the power amplifier 52 to output the audio sound in the space of the vehicle interior.

The main control unit 60 controls the entire in-vehicle apparatus 1 and performs an operation to detect a position where the user has touched with the touch panel 40. In outline, the main control unit 60 detects a position that is part of the operation screen displayed on the LCD 30 and that is touched by the user with an operation force larger than or equal to an operation determination threshold value with the touch panel 40 on a certain detection cycle. The main control unit 60 performs the above operation by executing a certain program stored in, for example, a read only memory (ROM) or a random access memory (RAM) with a central processing unit (CPU) and has various functions for the above operation.

Figure 2:
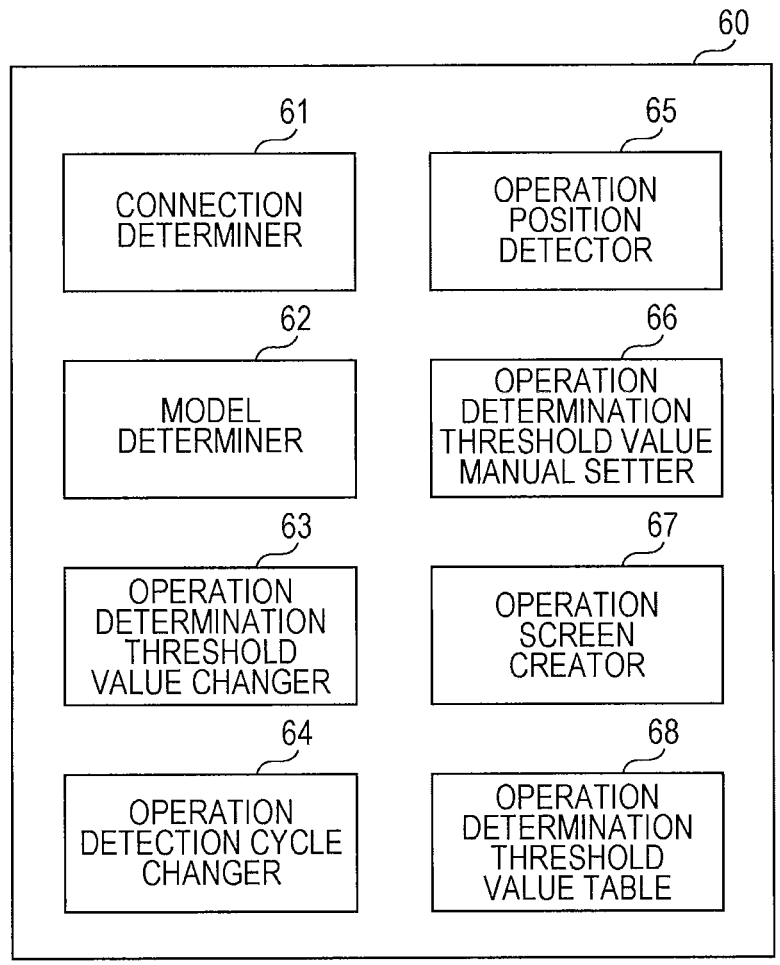
FIG. 2 shows an example of functional blocks in a main control unit.

FIG. 2 shows an example of functional blocks in the main control unit 60. Referring to FIG. 2, the main control unit 60 includes a connection determiner 61, a model determiner 62, an operation determination threshold value changer 63, an operation detection cycle changer 64, an operation position detector 65, an operation determination threshold value manual setter 66, an operation screen creator 67, and an operation determination threshold value table 68.

The connection determiner 61 determines whether the mobile terminal apparatus 90 is connected to the in-vehicle apparatus 1 via the USB cable. The model determiner 62 determines the model of the mobile terminal apparatus 90 connected to the in-vehicle apparatus 1.

The operation determination threshold value changer 63 changes the operation determination threshold value to a value corresponding to the connected mobile terminal apparatus 90 if the connection determiner 61 determines that the mobile terminal apparatus 90 is connected to the in-vehicle apparatus 1. The operation detection cycle changer 64 changes the detection cycle to a value corresponding to the connected mobile terminal apparatus 90 if the connection determiner 61 determines that the mobile terminal apparatus 90 is connected to the in-vehicle apparatus 1.

The operation position detector 65 detects a position that is part of the operation screen displayed on the LCD 30 and that is touched by the user with an operation force larger than or equal to the operation determination threshold value set by the operation determination threshold value changer 63 with the touch panel 40 on the detection cycle set by the operation detection cycle changer 64.

The operation determination threshold value manual setter 66 sets the operation determination threshold value in response to an instruction from the user. The setting in response to an instruction from the user is performed when the operation determination threshold value corresponding to the connected mobile terminal apparatus 90 is not stored in the operation determination threshold value table 68. The operation screen creator 67 creates a manual setting operation screen necessary for the setting by the operation determination threshold value manual setter 66. The manual setting operation screen is displayed on the LCD 30. The operation determination threshold value table 68 stores the mobile terminal apparatuses 90 that are targets for connection in association with the operation determination threshold values corresponding to the mobile terminal apparatuses 90.

The LCD 30 corresponds to a display unit, the touch panel 40 corresponds to a first touch panel, and the touch panel 92 of the mobile terminal apparatus 90 corresponds to a second touch panel. The operation position detector 65 corresponds to an operation position detecting unit, the connection determiner 61 corresponds to a connection determining unit, the operation determination threshold value changer 63 corresponds to an operation determination threshold value changing unit, the operation detection cycle changer 64 corresponds to an operation detection cycle changing unit, the operation determination threshold value table 68 corresponds to an operation determination threshold value storing unit, and the operation determination threshold value manual setter 66 corresponds to an operation determination threshold value manual setting unit.

Figure 3:
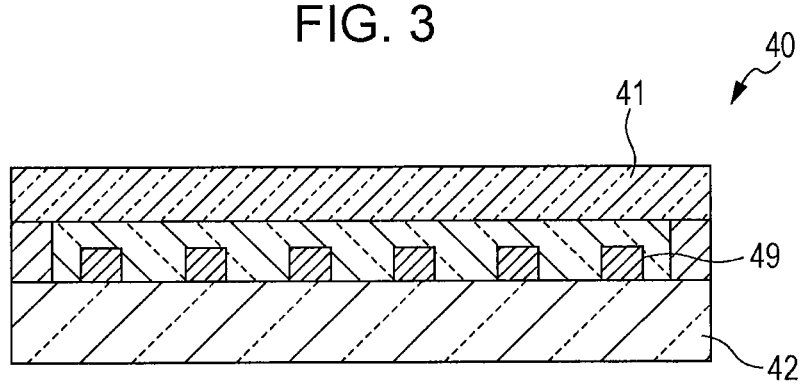
FIG. 3 is a cross-sectional view of a touch panel.

The configuration of each component in the in-vehicle apparatus 1 according to the present embodiment having the above entire configuration will now be described. FIG. 3 is a cross-sectional view of the touch panel 40. Referring to FIG. 3, the touch panel 40 includes two transparent panels 41 and 42 spaced apart by a certain distance and multiple spacers 49 arranged at certain intervals between the two transparent panels 41 and 42. The transparent panels 41 and 42 are each made of transparent glass or formed of a transparent film. Resistance films made of a transparent conductive material are provided on the opposing faces of the two transparent panels 41 and 42, and electrodes are mounted at both ends of each resistance film.

Figure 4:
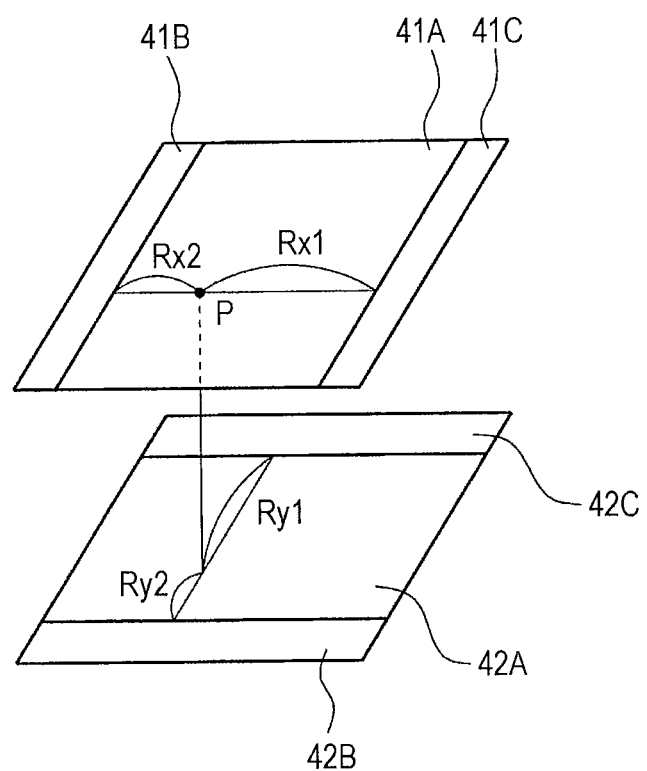
FIG. 4 is a schematic perspective view showing an example of the structure of resistance films provided on the opposing faces of transparent panels and electrodes.

FIG. 4 is a schematic perspective view showing an example of the structure of the resistance films provided on the opposing faces of the transparent panels 41 and 42 and the electrodes. Referring to FIG. 4, electrodes 41B and 41C are mounted along two opposing sides of a resistance film 41A provided on a surface of the transparent panel 41. Electrodes 42B and 42C are mounted along two opposing sides of a resistance film 42A provided on a surface of the transparent panel 42. The electrodes 41B and 41C mounted on the resistance film 41A are mounted in a direction orthogonal to that of the electrodes 42B and 42C mounted on the resistance film 42A.

Figure 5:
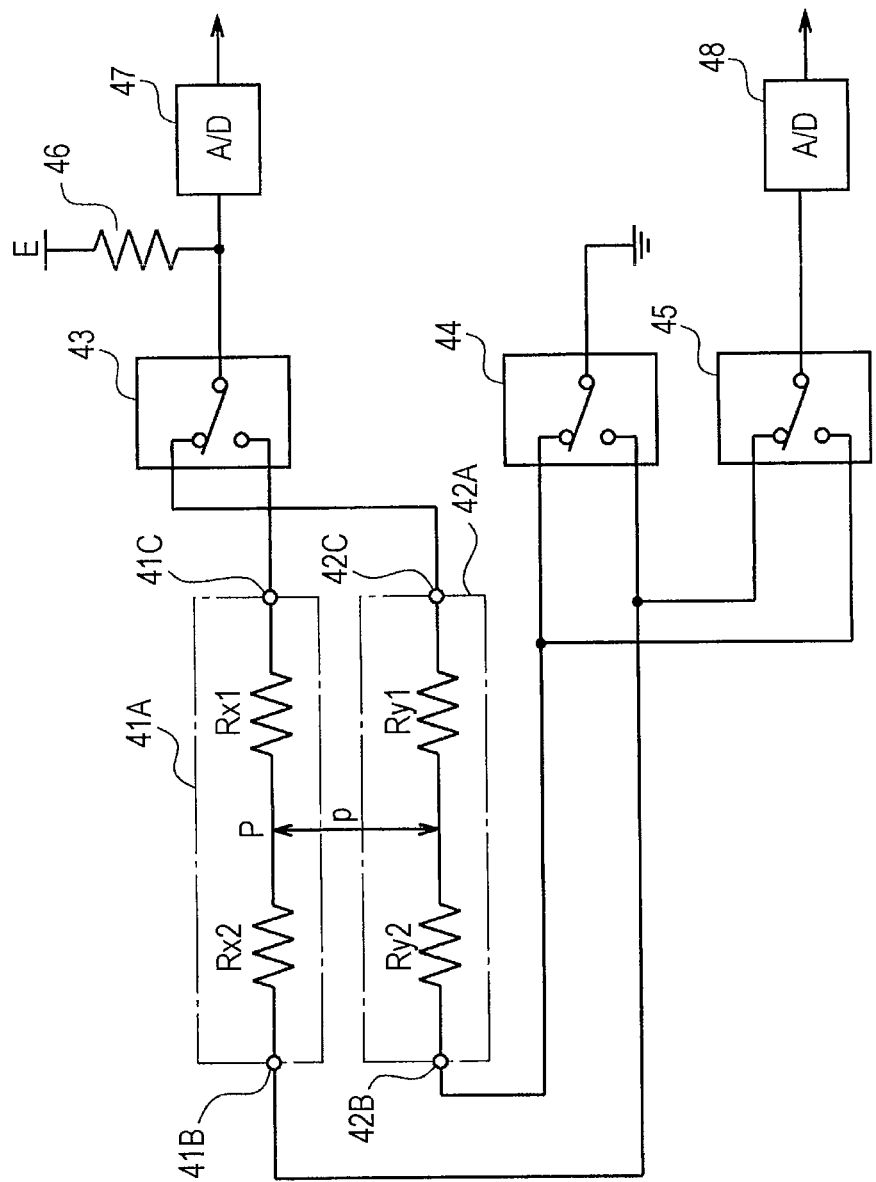
FIG. 5 is a diagram showing an equivalent circuit including the touch panel and peripheral circuits.

FIG. 5 is a diagram showing an equivalent circuit including the touch panel 40 and peripheral circuits. A voltage E of, for example, 3.3 V is selectively applied to the electrode 41C on the resistance film 41A and the electrode 42C on the resistance film 42A via a resistor 46 and a switch 43. The electrode 41B on the resistance film 41A and the electrode 42B on the resistance film 42A are selectively grounded via a switch 44 and are selectively connected to an analog-to-digital converter (A/D) 48 via a switch 45. The resistor 46 and an analog-to-digital converter (A/D) 47 correspond to a current value detecting unit.

It is assumed that a point P shown in FIG. 4 is touched by the user, the resistance film 41A is in contact with the resistance film 42A at the point P, and the contact forms a short-circuit path p shown in FIG. 5. It is also assumed that the direction in which the electrode 41B is aligned with the electrode 41C on the resistance film 41A corresponds to the X direction and the direction in which the electrode 42B is aligned with the electrode 42C on the resistance film 42A corresponds to the Y direction.

In order to detect the position of the point P along the X direction, the voltage E is applied to the electrode 41C on the resistance film 41A. At this time, the electrode 41B is grounded and the electrode 42B on the resistance film 42A is connected to the analog-to-digital converter 48. Such connection causes the voltage appearing at the point P on the resistance film 41A to be extracted via the short-circuit path p, the resistance film 42A, and the switch 45, and the extracted voltage is converted into digital data by the analog-to-digital converter 48. The operation position detector 65 in the main control unit 60 detects the position of the point P along the X direction on the basis of this digital data.

In order to detect the position of the point P along the Y direction, the voltage E is applied to the electrode 42C on the resistance film 42A. At this time, the electrode 42B is grounded and the electrode 41B on the resistance film 41A is connected to the analog-to-digital converter 48. Such connection causes the voltage appearing at the point P on the resistance film 42A to be extracted via the short-circuit path p, the resistance film 41A, and the switch 45, and the extracted voltage is converted into digital data by the analog-to-digital converter 48. The operation position detector 65 in the main control unit 60 detects the position of the point P along the Y direction on the basis of this digital data. The three switches 43, 44, and 45 are simultaneously switched on a certain cycle.

In the present embodiment, not only the positions of the point P along the X direction and the Y direction but also the magnitude of the operation force exerted on the point P are detected. In the case of touching of the point P by the user with his/her finger, the level of deformation due to the pressing of the fingertip on the touch panel 40 is increased with the increasing pressure on the point P (with the increasing magnitude of the operation force), and the resistance film 41A is in plane contact with the resistance film 42A over a wider range. Since the resistance film 41A is connected in parallel to the resistance film 42A in the range where the resistance film 41A is in plane contact with the resistance film 42A, the resistance value when current is caused to flow through the resistance film 41A or the resistance film 42A is made smaller, compared with a case in which the contact area is small or a case in which the resistance film 41A is in point contact with the resistance film 42A. Accordingly, detection of the value of current flowing through the resistance film 41A or the resistance film 42A allows the magnitude of the contact area between the resistance film 41A and the resistance film 42A, that is, the operation force when the user presses the touch panel 40 to be acquired. The resistor 46 and the analog-to-digital converter (A/D) 47 are used for the detection of the value of such current. The analog-to-digital converter 47 converts the voltage at one end of the resistor 46 into digital data. Since the voltage at the one end of the resistor 46 is varied when the value of the current flowing through the resistance film 41A or the resistance film 42A is changed, the digital data corresponding to the varied voltage is output from the analog-to-digital converter 47. The operation position detector 65 in the main control unit 60 acquires the operation force in the operation of the point P on the basis of this digital data.

The operation position detector 65 detects a position that is part of the touch panel 40 and that is touched by the user with an operation force larger than or equal to the operation determination threshold value on a certain detection cycle, as described above, in the present embodiment. Since the touching of the point P and the operation force when the point P is touched are known, the operation position detector 65 detects the point P as the touched position at a time when the operation force with which the point P is touched is made larger than or equal to the operation determination threshold value.

The relationship between the detection cycle and the operation determination threshold value will now be described. In order to cause a larger operation force to be exerted on the touch panel 40 on the operation screen, the operation force is gradually increased after the operation screen is lightly touched by the user with his/her finger or the like and it takes a long time to cause the larger operation force to be exerted. Since increasing the time (cycle) before it is determined whether the operation force is exerted causes the user to continue to press the touch panel 40 in a non-responsive state until that time, the operation force is gradually increased. In other words, it is possible to expect an effect (a reduction of the feeling of discomfort) similar to that when the operation determination threshold value is variably set also by increasing the determination cycle in proportion to the magnitude of the operation force. In addition, since the increase in the determination cycle decreases the determination count, it is possible to relieve the processing load. For the above reasons, in the present embodiment, the value of the determination cycle proportional to the magnitude of the operation determination threshold value is set and the position detection operation by the operation position detector 65 is performed at repetition intervals corresponding to the determination cycle.

Figure 6:
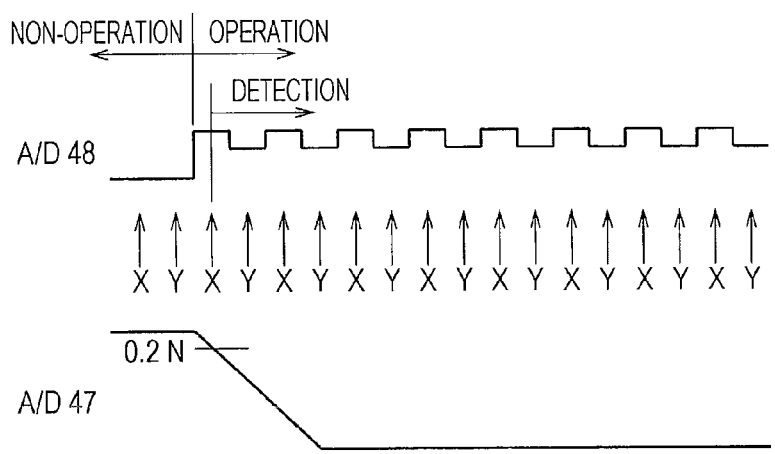
FIG. 6 illustrates an example of the relationship between an operation determination threshold value and an operation detection interval.
Figure 7:
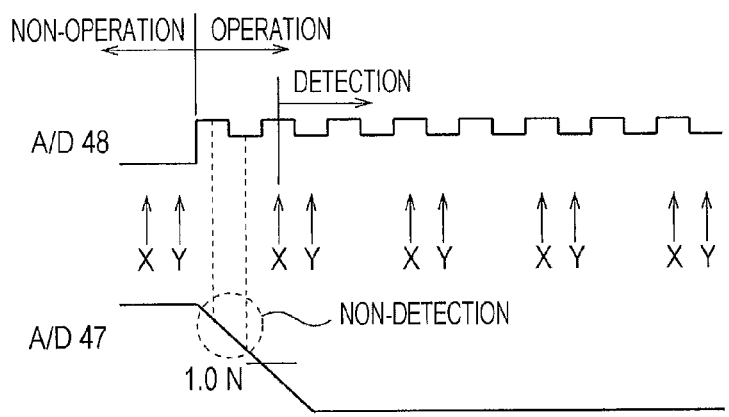
FIG. 7 illustrates another example of the relationship between the operation determination threshold value and the operation detection interval.
Figure 8:
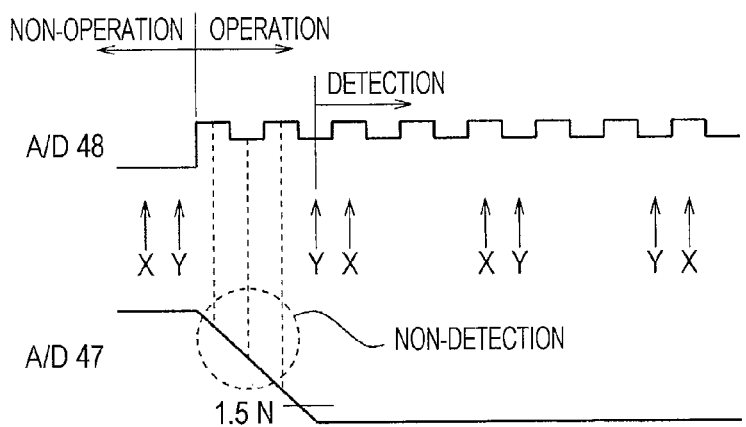
FIG. 8 illustrates another example of the relationship between the operation determination threshold value and the operation detection interval.

FIGS. 6 to 8 illustrate examples of the relationship between the operation determination threshold value and the operation detection interval. FIG. 6 illustrates an example of the relationship when the operation determination threshold value is low (0.2 N), FIG. 7 illustrates an example of the relationship when the operation determination threshold value is medium (1.0 N), and FIG. 8 illustrates and example of the relationship when the operation determination threshold value is high (1.5 N). Referring to FIGS. 6 to 8, "A/D 48" denotes the value of digital data (the voltage appearing at the point P) output from the analog-to-digital converter 48. The value "A/D 48" is decreased because the short-circuit path p is not formed in a non-operation state and the value "A/D 48" corresponds to the value at the point P because the short-circuit path p is formed in an operation state. "A/D 47" denotes the value of digital data (the voltage at one end of the resistor 46) output from the analog-to-digital converter 47. The value "A/D 47" is decreased with the increasing operation force of the user. "Detection" in FIGS. 6 to 8 denotes the timing when the position of the point P is detected after the point P is touched by the user. Upward arrows with letters X or Y denote the timing (detection timing) when the output from each of the analog-to-digital converter 47 and the analog-to-digital converter 48 is acquired by the operation position detector 65.

When the operation determination threshold value is low, the time required for the operation force to exceed the operation determination threshold value after the operation is started is short and the operation detection interval is also short, as shown in FIG. 6. Accordingly, the position touched by the user is rapidly detected. In contrast, when the operation determination threshold value is increased, the time required for the operation force to exceed the operation determination threshold value after the operation is started becomes longer and the operation detection interval is also longer, as shown in FIGS. 7 and 8. Accordingly, the time to detect the position touched by the user is increased.

Figure 9:
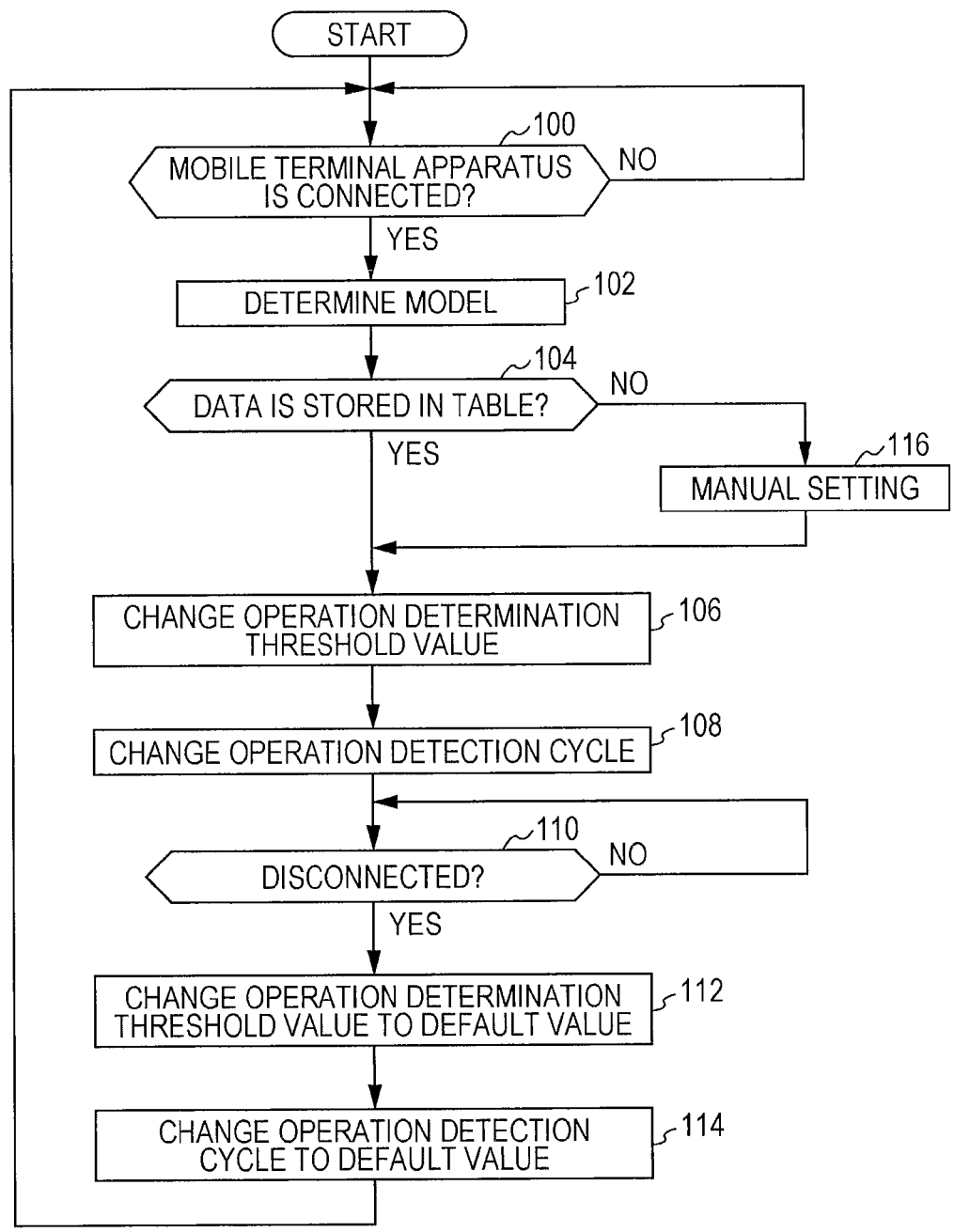
FIG. 9 is a flow chart showing an operational process of variably setting the operation determination threshold value and an operation detection cycle.

An operation to set the operation determination threshold value and an operation detection cycle will now be described. FIG. 9 is a flow chart showing an operational process of variably setting the operation determination threshold value and the operation detection cycle. After the in-vehicle apparatus 1 is started, in Step 100 the connection determiner 61 determines whether the mobile terminal apparatus 90 is connected to the in-vehicle apparatus 1. If the mobile terminal apparatus 90 is not connected to the in-vehicle apparatus 1 (NO in Step 100), the determination in Step 100 is negative and the determination in Step 100 is repeated. If the mobile terminal apparatus 90 is connected to the in-vehicle apparatus 1 via the USB cable (YES in Step 100), the determination in Step 100 is affirmative.

In Step 102, the model determiner 62 determines the model of the mobile terminal apparatus 90 connected to the in-vehicle apparatus 1. In Step 104, the operation determination threshold value changer 63 determines whether the operation determination threshold value corresponding to the determined model is stored in the operation determination threshold value table 68. If the operation determination threshold value corresponding to the determined model is stored in the operation determination threshold value table 68 (YES in Step 104), the determination in Step 104 is affirmative. In Step 106, the operation determination threshold value changer 63 reads out the operation determination threshold value corresponding to the connected mobile terminal apparatus 90 from the operation determination threshold value table 68 and changes the operation determination threshold value used in the position detection by the operation position detector 65 to the read out operation determination threshold value. In Step 108, the operation detection cycle changer 64 changes the value of the operation detection cycle to a value corresponding to the operation determination threshold value subjected to the change (a value proportional to the operation determination threshold value).

In Step 110, the connection determiner 61 determines whether the mobile terminal apparatus 90 is disconnected. If the connection is continued and the mobile terminal apparatus 90 is not disconnected (NO in Step 110), the determination in Step 110 is negative and the determination in Step 110 is repeated. If the mobile terminal apparatus 90 is disconnected (YES in Step 110), the determination in Step 110 is affirmative. In Step 112, the operation determination threshold value changer 63 returns the operation determination threshold value to the default value before the mobile terminal apparatus 90 is connected to the in-vehicle apparatus 1. In Step 114, the operation detection cycle changer 64 returns the operation detection cycle to the default value before the mobile terminal apparatus 90 is connected to the in-vehicle apparatus 1. The default value of the operation determination threshold value is desirably set to a value necessary for the operation of a key switch or the like when the in-vehicle apparatus 1 is provided with the key switch or the like serving as an operating unit including a mechanical movable part. This allows the feeling of discomfort occurring when both an operation with the touch panel 40 and another operation, such as an operation with the key switch or the like, are used to be eliminated.

If the operation determination threshold value corresponding to the determined model is not stored in the operation determination threshold value table 68 (NO in Step 104), the determination in Step 104 is negative. In Step 116, the operation determination threshold value manual setter 66 instructs the operation screen creator 67 to create and display a manual setting operation screen and, then, sets the operation determination threshold value by using the manual setting operation screen in response to an instruction from the user. For example, a manual setting operation screen for selecting the operation determination threshold value for the touch panel 92 of the mobile terminal apparatus 90 from multiple stages is displayed. In this case, the user can touch an appropriate point in the manual setting operation screen with the touch panel 92 to determine the operation determination threshold value having a desired value. Then, the process proceeds to the step of changing the operation determination threshold value in Step 106.

As described above, in the in-vehicle apparatus 1 of the present embodiment, since the operation determination threshold value for determining whether the operation with the touch panel 40 is performed is changed in accordance with the mobile terminal apparatus 90 connected to the in-vehicle apparatus 1 upon connection of the mobile terminal apparatus 90, it is possible to perform the operation with an operation force similar to that of the connected mobile terminal apparatus 90 to eliminate the feeling of discomfort when the in-vehicle apparatus 1 is operated (particularly in the terminal mode). In addition, since it is sufficient for the user to operate the in-vehicle apparatus 1 with the same operation force as that for the mobile terminal apparatus 90 which the user ordinarily uses, it is possible to prevent malfunction caused by the difference in the operation determination threshold value.

Setting the operation detection cycle to a value proportional to the magnitude of the operation determination threshold value corresponding to the connected mobile terminal apparatus 90 allows an appropriate detection cycle corresponding to the operation determination threshold value to be set and allows the detection cycle to be automatically determined in response to the determination of the operation determination threshold value. Accordingly, the detection cycle is easily set.

When the mobile terminal apparatus 90 is disconnected from the in-vehicle apparatus 1, the operation determination threshold value and the detection cycle are returned to the initial setting values (default values) before the mobile terminal apparatus 90 is connected. Accordingly, the operation determination threshold value can be temporarily changed only when the mobile terminal apparatus 90 is connected, to keep an optimal operation state that is set when the in-vehicle apparatus 1 is solely used.

Since the operation determination threshold value table 68 storing the mobile terminal apparatuses 90 that are targets for connection in association with the operation determination threshold values corresponding to the mobile terminal apparatuses 90 is provided and the operation determination threshold value corresponding to the mobile terminal apparatus 90 that is connected is read out from the operation determination threshold value table 68, it is possible to appropriately set the operation determination threshold value.

When the operation determination threshold value corresponding to the connected mobile terminal apparatus 90 is not stored in the operation determination threshold value table 68, the operation determination threshold value is manually set in response to an instruction from the user. Accordingly, even when no data exists for the connected mobile terminal apparatus 90, it is possible to reduce the feeling of discomfort caused by the difference in the operation force between the operation with the touch panel of the mobile terminal apparatus 90 and the operation with the touch panel of the in-vehicle apparatus 1.

Even when the touch panel 92 of the mobile terminal apparatus 90 is an electrostatic touch panel and is capable of being operated with a smaller operation force, it is possible to realize an operational feeling similar to that of the mobile terminal apparatus 90 having the electrostatic touch panel 92 also in the operation of the in-vehicle apparatus 1 to prevent malfunction when, for example, a swipe operation is performed.

Various modifications can be made without departing from the true spirit and scope of the invention. For example, although the present invention is applied to the in-vehicle apparatus 1 in the above embodiments, the present invention is applicable to a case in which a mobile terminal apparatus is connected to an information processing apparatus other than the in-vehicle apparatus 1, such as a personal computer to which a touch panel is mounted.

Although the operation determination threshold value in the operation of the touch panel 40 of the in-vehicle apparatus 1 is set so as to be equal to the operation determination threshold value corresponding to the connected mobile terminal apparatus 90 (the operation determination threshold value in the operation of the touch panel 92 of the mobile terminal apparatus 90 and the minimum value of the operation force with which the position detection is available) in the above embodiments, the operation determination threshold value in the operation of the touch panel 40 of the in-vehicle apparatus 1 is not necessarily equal to the operation determination threshold value corresponding to the mobile terminal apparatus 90. The operation determination threshold value in the operation of the touch panel 40 of the in-vehicle apparatus 1 may be varied so as to be close to the operation determination threshold value corresponding to the mobile terminal apparatus 90. This allows the feeling of discomfort caused by the difference in the operation force between the operation with the touch panel of the mobile terminal apparatus 90 and the operation with the touch panel of the in-vehicle apparatus 1 to be reliably reduced.

Although both the operation determination threshold value and the operation detection cycle are changed in accordance with the mobile terminal apparatus 90 in the above embodiments, only the operation determination threshold value may be changed.

Although the case in which the mobile terminal apparatus 90 is connected to the in-vehicle apparatus 1 via the USB cable is described in the above embodiments, the present invention is applicable to a case in which the mobile terminal apparatus 90 is connected to the in-vehicle apparatus 1 via another cable and a case in which wireless connection using Bluetooth (registered trademark) or over a wireless local area network (LAN) is performed.

Although the terminal mode is available when some of the mobile terminal apparatuses 90 are connected to the in-vehicle apparatus 1 in the above embodiments, the present invention is not limited to the operation in the terminal mode. The present invention is widely applicable to cases in which the mobile terminal apparatuses 90 are connected to the in-vehicle apparatus 1.

Although the touch panel 92 of the mobile terminal apparatus 90 is an electrostatic touch panel in the above embodiments, the touch panel 92 may be a touch panel adopting another method, such as a resistive film touch panel.

As described above, according to the present invention, since the operation determination threshold value for determining whether the operation with the first touch panel is performed is changed in accordance with the mobile terminal apparatus that is connected upon connection of the mobile terminal apparatus, it is possible to perform the operation with an operation force similar to that of the connected mobile terminal apparatus to eliminate the feeling of discomfort when the information processing apparatus is operated.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An information processing apparatus to which a mobile terminal apparatus is connectable, the information processing apparatus comprising:
a display unit configured to display an operation screen;
an operation position detecting unit configured to detect a position that is part of the operation screen displayed on the display unit and that is touched by a user with an operation force larger than or equal to an operation determination threshold value with a first touch panel on a certain detection cycle;
a connection determining unit configured to determine whether the mobile terminal apparatus is connected to the information processing apparatus; and
an operation determination threshold value changing unit configured to change the operation determination threshold value to a value corresponding to the connected mobile terminal apparatus if the connection determining unit determines that the mobile terminal apparatus is connected to the information processing apparatus.

2. The information processing apparatus according to claim 1, further comprising:

an operation detection cycle changing unit configured to change the detection cycle to a value corresponding to the connected mobile terminal apparatus if the connection determining unit determines that the mobile terminal apparatus is connected to the information processing apparatus.

3. The information processing apparatus according to claim 2,
wherein the operation detection cycle changing unit sets the detection cycle to a value proportional to the operation determination threshold value corresponding to the connected mobile terminal apparatus.

4. The information processing apparatus according to claim 2,
wherein the mobile terminal apparatus includes a second touch panel with which a position that is part of an operation screen displayed on a display unit of the mobile terminal apparatus and that is touched by the user with a certain operation force is detected, and
wherein the operation determination threshold value changing unit changes the operation determination threshold value from a current value to a value close to a minimum value of the operation force with which position detection with the second touch panel is available.

5. The information processing apparatus according to claim 4,
wherein the operation determination threshold value changing unit sets the value that is equal to the minimum value of the operation force with which the position detection with the second touch panel is available as the operation determination threshold value subjected to the change.

6. The information processing apparatus according to claim 4,
wherein the second touch panel is an electrostatic touch panel.

7. The information processing apparatus according to claim 2,
wherein the operation detection cycle changing unit sets the detection cycle to a value proportional to a magnitude of the operation determination threshold value corresponding to the connected mobile terminal apparatus.

8. The information processing apparatus according to claim 2,
wherein the operation determination threshold value and the detection cycle are changed to initial setting values before the mobile terminal apparatus is connected when the connection determining unit determines that the mobile terminal apparatus is disconnected.

9. The information processing apparatus according to claim 8, further comprising:
an operating unit including a mechanical movable part,
wherein the initial setting value of the operation determination threshold value is equal to the value necessary for the operation of the operating unit.

10. The information processing apparatus according to claim 2, further comprising:
an operation determination threshold value storing unit configured to store the mobile terminal apparatus that is a target for connection in association with the operation determination threshold value corresponding to the mobile terminal apparatus,
wherein the operation determination threshold value changing unit reads out the operation determination threshold value corresponding to the connected mobile terminal apparatus from the operation determination threshold value storing unit.

11. The information processing apparatus according to claim 10, further comprising:
an operation determination threshold value manual setting unit configured to set the operation determination threshold value in response to an instruction from the user if the operation determination threshold value corresponding to the connected mobile terminal apparatus is not stored in the operation determination threshold value storing unit.

12. The information processing apparatus according to claim 2,
wherein the first touch panel is a resistive film touch panel.

13. The information processing apparatus according to claim 12,
wherein the first touch panel includes two transparent panels spaced apart by a certain distance, resistance films that are made of a transparent conductive material and that are provided on opposing faces of the two respective transparent panels, and a current value detecting unit that detects the value of current flowing when a certain voltage is applied to both ends of the resistance film provided on each of the two transparent panels, and
wherein the operation position detecting unit determines whether the operation force of the user is larger than or equal to the operation determination threshold value on the basis of the current value detected by the current value detecting unit.

14. The information processing apparatus according to claim 13,
wherein the operation position detecting unit determines whether the operation force of the user is larger than or equal to the operation determination threshold value on the detection cycle and identifies an operation position touched by the user if the operation force of the user is larger than or equal to the operation determination threshold value.

15. The information processing apparatus according to claim 2,
wherein the information processing apparatus is mounted in a vehicle.

16. An information processing method for an information processing apparatus to which a mobile terminal apparatus is connectable, the information processing method comprising:
displaying an operation screen;
detecting a position that is part of the displayed operation screen and that is touched by a user with an operation force larger than or equal to an operation determination threshold value with a first touch panel on a certain detection cycle;
determining whether the mobile terminal apparatus is connected to the information processing apparatus; and
changing the operation determination threshold value to a value corresponding to the connected mobile terminal apparatus if it is determined that the mobile terminal apparatus is connected to the information processing apparatus.

17. The information processing method according to claim 16, further comprising:
changing the detection cycle to a value corresponding to the connected mobile terminal apparatus if it is determined that the mobile terminal apparatus is connected to the information processing apparatus.

18. The information processing method according to claim 17,
wherein changing the detection cycle to a value corresponding to the mobile terminal apparatus sets the detection cycle to a value proportional to the operation determination threshold value corresponding to the connected mobile terminal apparatus.

19. The information processing method according to claim 17,
wherein the mobile terminal apparatus includes a second touch panel that detects a position that is part of an operation screen displayed on a display unit of the mobile terminal apparatus and that is touched by the user with a certain operation force, and
wherein changing the operation determination threshold value to a value corresponding to the connected mobile terminal apparatus changes the operation determination threshold value from a current value to a value close to a minimum value of the operation force with which position detection with the second touch panel is available.

20. The information processing method according to claim 19,
wherein changing the operation determination threshold value to a value corresponding to the connected mobile terminal apparatus sets the value that is equal to the minimum value of the operation force with which the position detection with the second touch panel is available as the operation determination threshold value subjected to the change.

* * * * *